United States Patent
Kimura

(10) Patent No.: US 7,474,835 B2
(45) Date of Patent: Jan. 6, 2009

(54) DISC PLAYBACK APPARATUS AND DISC PLAYBACK METHOD

(75) Inventor: Masaru Kimura, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 1264 days.

(21) Appl. No.: 10/234,027

(22) Filed: Sep. 3, 2002

(65) Prior Publication Data

US 2003/0049019 A1  Mar. 13, 2003

(30) Foreign Application Priority Data

Sep. 12, 2001  (JP)  ............................. 2001-276465

(51) Int. Cl.
*H04N 5/76* (2006.01)
*H04N 7/00* (2006.01)
*H04N 5/00* (2006.01)

(52) U.S. Cl. ........................................ 386/96; 386/125
(58) Field of Classification Search ................ 386/69, 386/125, 95, 96
See application file for complete search history.

(56) References Cited

U.S. PATENT DOCUMENTS

| | | | | |
|---|---|---|---|---|
| 5,555,098 A | * | 9/1996 | Parulski | 386/104 |
| 5,576,950 A | * | 11/1996 | Tonomura et al. | 386/121 |
| 5,878,292 A | * | 3/1999 | Bell et al. | 396/312 |
| 6,167,192 A | | 12/2000 | Heo | |
| 6,421,470 B1 | * | 7/2002 | Nozaki et al. | 382/321 |
| 6,571,054 B1 | * | 5/2003 | Tonomura et al. | 386/95 |
| 6,594,442 B1 | * | 7/2003 | Kageyama et al. | 386/96 |
| 6,640,045 B2 | * | 10/2003 | Otomo et al. | 386/95 |
| 6,778,760 B1 | * | 8/2004 | Kagle | 386/96 |
| 7,286,746 B1 | * | 10/2007 | Ando et al. | 386/52 |

FOREIGN PATENT DOCUMENTS

| | | |
|---|---|---|
| JP | 01-300777 | 12/1989 |
| JP | 2001-045428 | 2/2001 |
| JP | 2001-078123 | 3/2001 |
| JP | 2001-103417 | 4/2001 |
| JP | 2001-148154 | 5/2001 |

* cited by examiner

*Primary Examiner*—Thai Tran
*Assistant Examiner*—Gelek Topgyal
(74) *Attorney, Agent, or Firm*—Brinks Hofer Gilson & Lione

(57) ABSTRACT

A disc playback apparatus capable of effectively utilizing an image display function is provided. When an instruction for setting a still image is made, a selection screen creation section performs processes for creating and displaying a predetermined selection screen. The selection screen contains a plurality of reduced still images, so that one of the still images can be selected. When one still image is selected on the selection screen, a still image information setting section associates the selected still image with the track of the audio information to be played back at that time. When the audio information of this track is to be played back at a subsequent playback time, the still image which is associated by the previous process is displayed.

16 Claims, 12 Drawing Sheets

FIG. 10

STILL IMAGE SETTING MODE

SELECT A STILL IMAGE NUMBER (1 TO 150)   NO. 92
       (SET USING "SET KEY")

REDUCED
STILL IMAGE
92

STILL IMAGE SETTING MODE

SELECT A TRACK NUMBER    TR 0008
        (SET USING "SET KEY")

REDUCED
STILL IMAGE
13

```
STILL IMAGE SETTING MODE

SPECIFY PLAYBACK RANGE
(SET USING "SET KEY")

TR0008   00:30  —  TR0008   02:50

┌─────────────────────┐
         │                     │
         │     REDUCED         │
         │     STILL IMAGE     │
         │       #45           │
         │                     │
         └─────────────────────┘
```

DISC PLAYBACK APPARATUS AND DISC PLAYBACK METHOD

BACKGROUND OF THE INVENTION

1. Field of the Invention

The present invention relates to a disc playback apparatus for playing back audio information and still image information recorded on a disc-type recording medium.

2. Description of the Related Art

Hitherto, disc-type recording media in which audio information required to play back audio and still image information required to play back still images are recorded, and disc playback apparatuses for playing back such disc-type recording media have been known.

For example, in the DVD-audio standard which has recently attracted attention, DVDs (Digital Versatile Discs) are used as disc-type recording media, so that audio with high sound quality exceeding that of existing CDs (Compact Discs) can be recorded, or a large number (for example, several thousands) of still images to be played back together with audio can be recorded. By playing back such disc-type recording media with a disc playback apparatus, for example, while music is being played back, a still image for the artist who plays that music and a still image created to match the image of the music can be displayed.

In the above-described disc-type recording media, it is not always necessary to record still image information in such a manner as to correspond to the entire audio information region. There are cases in which corresponding still image information is provided in some of the audio information regions, but corresponding still image information is not provided in the other regions. For this reason, when audio information of a region having no associated still image information is played back, a still image is not displayed on the screen, and the image display function provided in the disc playback apparatus cannot be utilized effectively.

Furthermore, in a case where the content of the still image information which is associated with audio information in advance does not match the preference of the user, it is not possible for the user to freely set and display a desired still image. For this reason, when a still image does not match the user's preference, the user views the still image display less frequently, and it cannot be said that the image display function provided in the disc playback apparatus is utilized effectively.

SUMMARY OF THE INVENTION

The present invention has been made to address such problems. An object of the present invention is to provide a disc playback apparatus which is capable of effectively utilizing an image display function.

To achieve the above-mentioned object, in a disc playback apparatus in accordance with the present invention, when a playback operation is to be performed by using a disc-type recording medium in which audio information and still image information are recorded, the setting of still image information corresponding to audio information is performed by a still image information setting section, and the correspondence information that is set by the still image information setting section is stored in a correspondence information storage section. Then, based on the correspondence information stored in the correspondence information storage section, a disc information playback section plays back the still image information which is associated by the still image information setting section together with the audio information corresponding to the still image information. Since the still image information corresponding to the audio information is associated as desired, and the still image information and the audio information corresponding to the still image information are played back, it becomes possible to display a desired still image when the audio information is played back. Therefore, the image display function provided in the disc playback apparatus can be utilized effectively.

Furthermore, in the still image information setting section, when a plurality of pieces of still image information correspond to some of the regions of the audio information and the still image information does not correspond to the remaining regions, preferably, one of the plurality of pieces of still image information is made to correspond to the remaining regions. When audio information in regions (remaining regions) with which the still image information is not associated is to be played back, in the conventional case, a still image is not displayed, and the image display function provided in the disc playback apparatus is not utilized effectively. However, in the disc playback apparatus of the present invention, since one of the plurality of pieces of still image information recorded on a disctype recording medium can be displayed, the image display function can be utilized effectively, and the user can enjoy viewing. Furthermore, for a manufacturer of disc-type recording media, since still images can be displayed without having to make the still image information correspond to all the regions of the audio information, the amount of still image information to be recorded can be reduced, and the burden on the manufacturer can be reduced.

The disc playback apparatus may further comprise a selection screen creation section for creating a selection screen in which, when the still image information is played back in a reduced manner, a plurality of reduced still images are contained within one screen, and a first operation section for performing an operation of selecting one of the reduced still images from within the selection screen created by the selection screen creation section. Preferably, the still image information setting section performs a process of associating the still image information with the audio information on the basis of the operation by the first operation section. As a result of using a selection screen containing a plurality of reduced still images, it is possible to associate the remaining regions with the still image information while confirming the contents of the still image. Therefore, it is possible for the user to easily and reliably select a desired still image.

Preferably, the first operation section is capable of switching the selection screen, and the selection screen creation section updates the plurality of reduced still images contained in the selection screen when an operation for switching the selection screen is performed using the first operation section. As a result, even when a large number of still images are recorded on a disc-type recording medium and the reduced still images corresponding to all the still images cannot be displayed within one screen, only a few reduced still images need to be displayed, so that when it is desired to view another still image, the displayed contents are updated by performing a switching operation. Consequently, the number of reduced still images to be contained in one selection screen can be reduced. Therefore, it becomes possible to ensure a sufficient display area for each reduced still image, allowing the selection screen to be easier to view.

Preferably, the still image information setting section makes still image information corresponding to the reduced still image selected using the first operation section correspond to the audio information being played back at that time. As a result, simply by performing an operation using the first operation section when desired audio information is being played back, still image information can be associated with this audio information. Consequently, the number of operations can be reduced to improve the ease of operation.

The still image information setting section may automatically perform setting for making still image information correspond to audio information. As a result, since certain still image information is automatically assigned to the audio information and is displayed, there is no need for the user to manually set the still image information, thereby making the apparatus more convenient for the user.

The disc playback apparatus may further comprise a second operation section for performing an operation of specifying numbers which specify a plurality of pieces of still image information, so that, preferably, the still image information setting section performs a process for making the still image information correspond to the remaining regions of the audio information on the basis of the operation by the second operation section. As a result, it becomes possible to make still image information correspond to the remaining regions of the audio information by a simple operation of entering a number corresponding to desired still image information.

As the number to be specified by the second operation section, preferably, a number corresponding to a recording position of the still image information in the disc-type recording medium is used. As numbers corresponding to recording positions in the disc-type recording medium, for example, serial numbers, such as 1, 2, 3, . . . , may be used in the order that the still image information is stored. By using such simple numbers, it becomes easy for the user to intuitively recognize numbers which specify a plurality of pieces of still image information, making it possible to improve the ease of operation.

As the number to be specified by the second operation section, preferably, a track number of the disc-type recording medium in which audio information corresponding to still image information is recorded is used. In general, the user often recognizes the segments of the audio information on the basis of the track number. Also, the user often recognizes the desired still image information in such a manner as to be associated with the track number, for example, the still image displayed while the audio information of track 1 is being played back. Therefore, by using a track number, it is possible to easily specify the desired still image information.

Preferably, the still image information setting section specifies a track number in a disc-type recording medium on which audio information being played back is stored so as to make still image information correspond to the audio information stored in this track. Generally, audio information is often stored in such a manner as to make one piece of music correspond to one track. Furthermore, the user often desires a still image to be displayed for each piece of music. Therefore, by associating the still image information with each track, an intuitive associating process can be performed by a simple user operation.

The disc playback apparatus may further comprise a range specification section for specifying a playback range of the audio information with which the still image information is associated by the still image information setting section. As a result, for example, for particular audio information, a time period in which a desired still image is displayed when audio information is to be played back can be set in detail, such as a still image A for the initial one minute from the start, a still image B for the next 30 seconds, a still image C for the next one minute, and so on.

The disc playback apparatus may further comprise a playback instruction screen creation section for creating a playback instruction screen in which, when the plurality of pieces of still image information associated with the audio information by the still image information setting section are played back in a reduced manner, a plurality of reduced still images are contained within one screen, and a third operation section for performing an operation for selecting one of the reduced still images from within the playback instruction screen created by the playback instruction screen creation section. When one of the reduced still images is selected by the operation using the third operation section, preferably, the disc information playback section plays back the audio information corresponding to the selected reduced still image. Since desired still image information can be specified by selecting a reduced still image by using the playback instruction screen and the playback of the audio information corresponding to the still image information can be instructed, an operation is possible which is visually superior to that when playback of audio information is instructed by specifying a track number, etc., as in the conventional case, and the ease of operation can be improved.

Preferably, the third operation section is capable of switching the playback instruction screen, and the playback instruction screen creation section updates the plurality of reduced still images contained in the playback instruction screen when an operation for switching the playback instruction screen is performed using the third operation section. As a result, even when a lot of still image information is recorded on a disc-type recording medium and reduced still images corresponding to all the still image information cannot be displayed within one screen, only a few reduced still images need to be displayed so that, when another reduced still image is desired to be viewed, a switching operation is performed to update the display contents, making it possible to reduce the number of reduced still images to be contained on one playback instruction screen. Therefore, it becomes possible to ensure a sufficient display area for each reduced still image, allowing the playback instruction screen to be easier to view.

The disc playback apparatus may further comprise a playback audio information specification section for, when one of the reduced still images is selected by the operation of the third operation section, specifying the audio information corresponding to this reduced still image on the basis of the correspondence information stored in the correspondence information storage section. By specifying the audio information corresponding to the selected still image information on the basis of the correspondence information, it is possible to easily specify the audio information to be played back.

As described above, according to the present invention, while audio information to which still image information is not assigned is being played back, another piece of still image information recorded on the same disc-type recording medium is assigned and a still image can be displayed on the screen. Therefore, an image display function possessed by the disc playback apparatus can be utilized effectively. Furthermore, for a manufacturer of disc-type recording media, since a still image can be displayed without making still image information correspond to all the regions of the audio information, there is an advantage that the amount of still image information to be recorded can be reduced and the burden on the manufacturer can be reduced.

BRIEF DESCRIPTION OF THE DRAWINGS

FIG. 10 shows an example of a selection screen displayed in a case where desired still image information is selected using a number corresponding to a position at which the still image information is recorded;

FIG. 11 shows an example of a selection screen displayed in a case where desired still image information is selected using a track number of audio information corresponding to the still image information;

FIG. 13 shows an example of a setting screen displayed on which the playback range of audio information to which still image information is assigned is set.

DESCRIPTION OF THE PREFERRED EMBODIMENTS

A disc playback apparatus according to an embodiment of the present invention will be described below with reference to the drawings.

(1) Contents of Data Recorded on DVD

Details of data recorded on a DVD, which is a disc-type recording medium, will now be described first.

Figure 1:
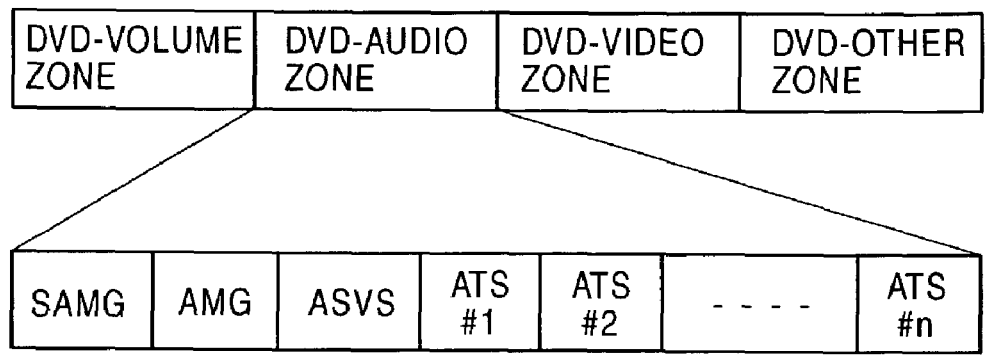
FIG. 1 shows the structure of a volume space of a DVD.

FIG. 1 shows the structure of a volume space of a DVD. As shown in FIG. 1, the volume space of a DVD is formed by, from the inner region of the DVD toward the outer region, a DVD-volume zone, a DVD-audio zone, a DVD-video zone, and a DVD-other zone.

The DVD-audio zone has stored therein various types of data required for an operation to play back audio, such as music, in accordance with the DVD-audio standard. Specifically, the DVD-audio zone is formed of an SAMG (simple audio manager), an AMG (audio manager), an ASVS (audio still video set), and an ATS (audio title set).

The SAMG contains management information used in a disc playback apparatus which performs simple playback for playing back audio of only two channels and for not playing back video. The AMG contains the management information of the entire disc and data for a visual menu.

The ASVS contains various types of data for concurrently displaying a still image while audio is being played back. The ATS contains management information, audio information, etc., required to play back audio.

Figure 2:
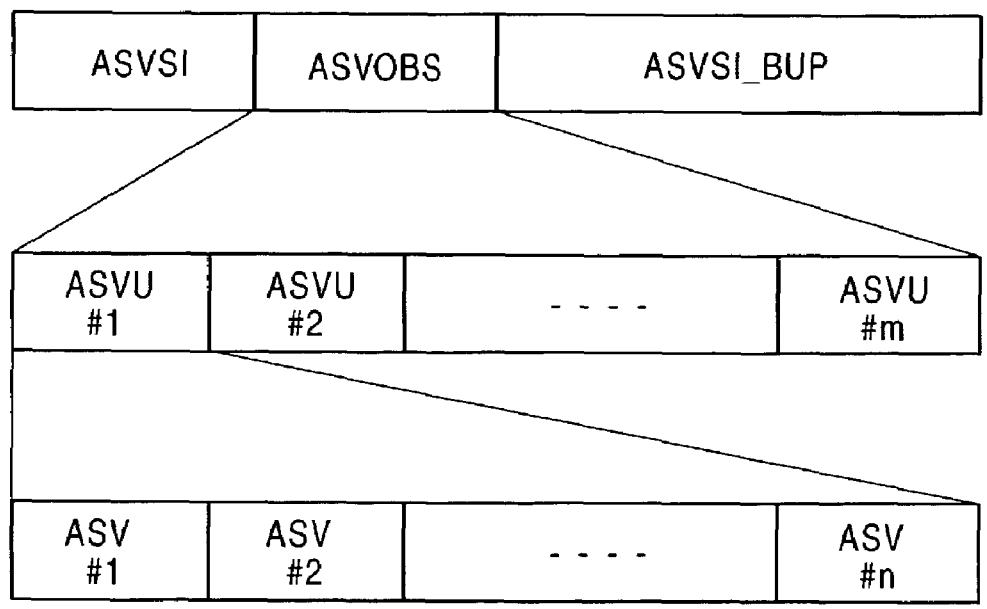
FIG. 2 shows the data structure of an ASVS (audio still video set)

FIG. 2 shows the data structure of the ASVS. As shown in FIG. 2, the ASVS is formed of ASVSI (audio still video set information), an ASVOBS (audio still video object set), and an ASVSI_BUP (file for backing up ASVSI).

The ASVSI contains management information of a still image to be played back together with audio, specifically, information such as the characteristics of ASVU (to be described later), and a storage address.

The ASVOBS is data necessary for displaying a plurality of still images and is formed by one or more ASVUs (audio still video units). This ASVU is a unit which is read in advance and is stored in a memory when a still image is to be played back, and contains one or more pieces of ASV (still image information).

The ASV is created by employing image data compression technology using, for example, MPEG2 and contains image data corresponding to one I picture (intra-frame coded image). Since an I picture alone in MPEG2 can be subjected to a decoding process, by storing image data corresponding to an I picture in advance as an ASV, it is possible to display a still image.

Figure 3:
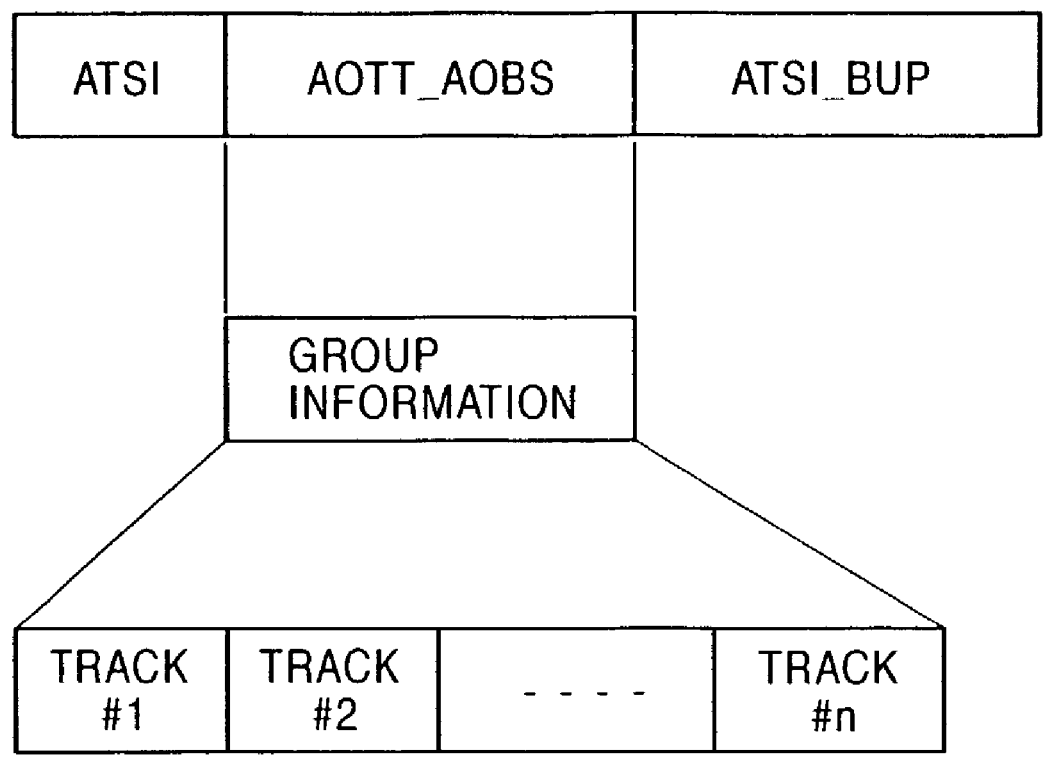
FIG. 3 shows the data structure of an ATS (audio title set)

FIG. 3 shows the data structure of an ATS. As shown in FIG. 3, the ATS is formed by ATSI (audio title set information), an AOTT_AOBS (recording area of audio information of DVD-audio), and an ATSI_BUP (file for backing up ATSI).

The ATSI contains management information of an ATS, for example, information on playback of audio information and on playback of a still image when audio is played back. The AOTT_AOBS is a recording area for audio information in the DVD-audio standard and is formed in such a manner as to contain one or more tracks. Audio information to be played back is actually stored in each track.

Furthermore, in the DVD-audio standard, a group containing one or more ATS can be formed. The information about a group to which each ATS belongs is stored in the "group information" shown in FIG. 3. For example, when ATS #1 belongs to group 1 and group 2, that information is stored in the group information corresponding to ATS #1. Then, as a result of specifying a group to be played back when audio is played back, the audio information contained in the ATS belonging to the specified group is read in sequence, and audio is played back.

(2) Overall Configuration of Disc Playback Apparatus

Figure 4:
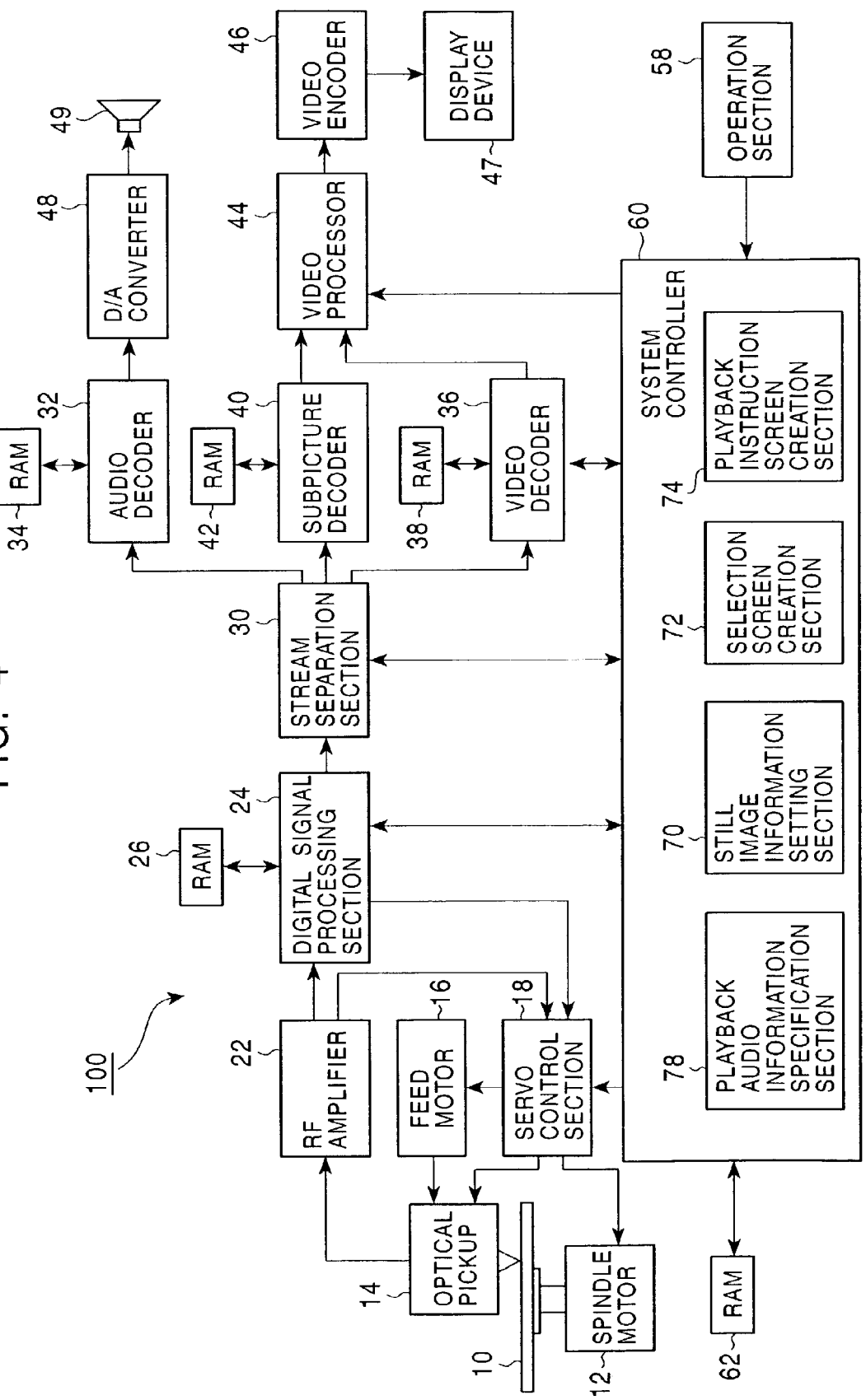
FIG. 4 shows the overall configuration of a disc playback apparatus according to an embodiment of the present invention.

FIG. 4 shows the overall configuration of a disc playback apparatus according to an embodiment of the present invention. A disc playback apparatus 100 shown in FIG. 4 has both a function for playing back a movie, etc., recorded in accordance with the DVD-video standard and a function for playing back audio recorded in accordance with the DVD-audio standard. The disc playback apparatus 100 comprises a spindle motor 12, an optical pickup 14, a feed motor 16, a servo control section 18, an RF amplifier 22, a digital signal processing section 24, four buffer RAMs 26, 34, 38, and 42, a stream separation section 30, an audio decoder 32, a video decoder 36, a sub-picture decoder 40, a video processor 44, a video encoder 46, a display device 47, a digital-to-analog (D/A) converter 48, a speaker 49, an operation section 58, a system controller 60, and a RAM 62.

The spindle motor 12 causes a DVD 10 to rotate at a predetermined number of revolutions. The optical pickup 14 detects data recorded on the DVD 10 and includes, for example, a semiconductor laser and a photodiode. The feed motor 16 causes the optical pickup 14 to move in the radial direction of the DVD 10.

The servo control section 18 drives the spindle motor 12 and the feed motor 16 in accordance with an instruction from the system controller 60, and causes an objective lens (not shown) incorporated in the optical pickup 14 to be moved in order to move the focal position of the semiconductor laser in directions perpendicular to and horizontal to the recording surface of the DVD 10. Furthermore, the servo control section 18 performs various types of servo (focus servo, tracking servo, and rotation servo) control required to read data from the DVD 10.

The RF amplifier 22 amplifies an electrical signal supplied from a photodiode incorporated in the optical pickup 14. The digital signal processing section 24 converts a signal provided by the RF amplifier 22 into digital data, then performs a signal decoding process and an error correction process thereon in accordance with the data format of the DVD 10, and stores the generated data in the RAM 26.

The stream separation section 30 separates a data stream received from the digital signal processing section 24 in accordance with an instruction from the system controller 60. For example, when audio recorded in accordance with the DVD-audio standard is to be played back, the stream separation section 30 separates an ATS output received from the digital signal processing section 24 into an ATSI and an AOTT_AOBS. The ATSI separated by the stream separation section 30 is transferred to the system controller 60, and the audio information of each track contained in the AOTT_AOBS is supplied to the audio decoder 32.

In the disc playback apparatus 100 of this embodiment, when audio is to be played back, prior to a process of reading an ATS corresponding to a group to be played back, an ASVU associated with the group is read. In this case, the stream separation section 30 separates an ASVS output received from the digital signal processing section 24 into an ASVSI and an ASVU. The ASVSI separated by the stream separation section 30 is transferred to the system controller 60, and the ASVU is supplied to the video decoder 36.

The audio decoder 32 performs a predetermined decoding process on the audio information received from the stream separation section 30. When an ASVU is received from the stream separation section 30, the video decoder 36 temporarily stores the ASVU in the RAM 38. Then, the video decoder 36 reads one of the ASVs contained in the ASVU and performs a predetermined decoding process in accordance with an instruction from the system controller 60. Furthermore, when video information of the DVD-video standard is output from the stream separation section 30, the video decoder 36 performs a predetermined decoding process on this video information. The sub-picture decoder 40 performs a predetermined decoding process on the sub-picture information supplied from the stream separation section 30.

The video processor 44 combines the data supplied from the video decoder 36 and the data supplied from the sub-picture decoder 40 and provides the resulting data to the video encoder 46 in accordance with an instruction from the system controller 60.

The video encoder 46 converts the combined data supplied from the video processor 44 into a display video signal. This video signal is supplied to the display device 47, whereby a still image, etc., is displayed.

The digital-to-analog converter 48 converts data supplied from the audio decoder 32 into an analog audio signal. This audio signal is supplied to the speaker 49, whereby audio is played back.

The operation section 58 has various operation keys, such as a playback key for instructing the playback of audio and a stop key for instructing that playback be stopped, and provides a signal corresponding to the operation status of the keys to the system controller 60.

The system controller 60 controls all the functional blocks contained within the disc playback apparatus 100, such as the various servo instructions being supplied to the servo control section 18 in order to control the playback of audio and a still image. The system controller 60 comprises a still image information setting section 70, a selection screen creation section 72, and a playback instruction screen creation section 74.

The still image information setting section 70 performs a process for, when regions (remaining regions) with which still image information is not associated exist in the audio information, associating still image information with the remaining regions. There are cases in which this process of associating the still image information with the remaining regions is performed in accordance with an operation instruction issued by the user and this process is performed automatically. The details of the operation in each case will be described later. The information (correspondence information) about the association between the remaining regions and the still image information, set by the still image information setting section 70, is stored in the RAM 62.

The selection screen creation section 72 creates a predetermined selection screen for selecting a still image in a case where a process of associating still image information with the remaining regions of the audio information is performed in accordance with an operation instruction issued by the user. This selection screen is formed in such a manner as to contain a plurality of still images (reduced still images) that have been subjected to a predetermined reduction process.

The playback instruction screen creation section 74 creates a predetermined playback instruction screen for selecting a plurality of reduced still images. In this embodiment, by selecting a desired still image on a playback instruction screen created by the playback instruction screen creation section 74, an instruction for playing back audio information associated with the selected still image can be made. When one of the reduced still images is selected using the operation section, the playback audio information specification section 78 specifies audio information corresponding to this reduced still image in accordance with the association information stored in the association information storage section.

The spindle motor 12, the optical pickup 14, the feed motor 16, the servo control section 18, the RF amplifier 22, the digital signal processing section 24, the four buffer RAMs 26, 34, 38, and 42, the stream separation section 30, the audio decoder 32, the video decoder 36, the sub-picture decoder 40, the video processor 44, the video encoder 46, the digital-to-analog (D/A) converter 48, and the system controller 60 correspond to a disc information playback section. The still image information setting section 70 corresponds to the still image information setting section. The RAM 62 corresponds to the correspondence information storage section. The selection screen creation section 72 corresponds to the selection screen creation section. The playback instruction screen creation section 74 corresponds to the playback instruction screen creation section. The operation section 58 corresponds to the first to third operation sections. The playback audio information specification section 78 corresponds to the playback audio information specification section.

(3) Operation of Disc Playback Apparatus

The disc playback apparatus 100 of this embodiment has a configuration such as that described above. Next, the operation of the disc playback apparatus 100 will be described below.

a. Operation when Manually Setting a Still Image to be Displayed

Figure 5:
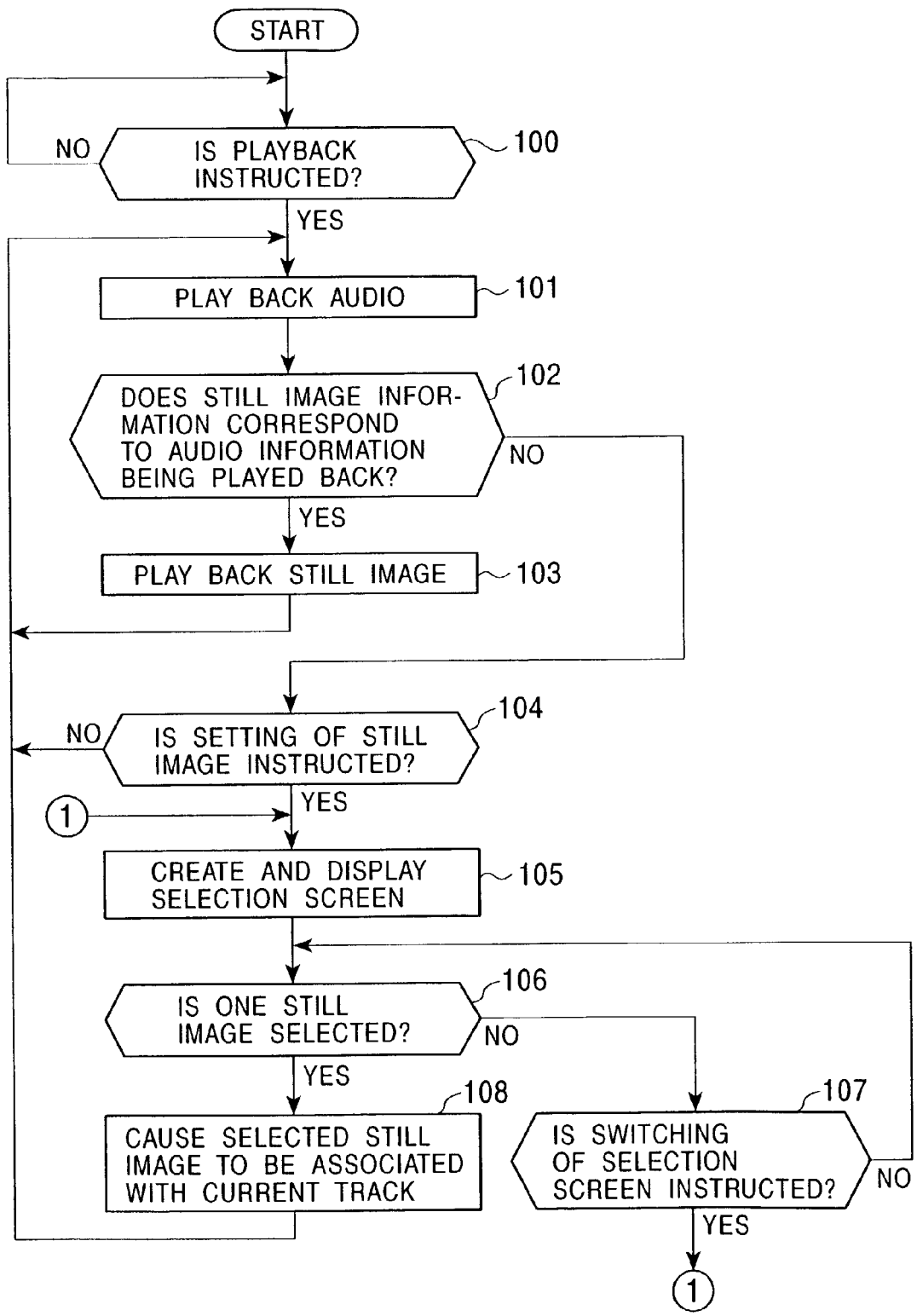
FIG. 5 is a flowchart showing the operation of a disc playback apparatus in a case where still image information is to be associated with remaining regions, with which still image information was not associated, within audio information in accordance with an operation instruction by a user.

FIG. 5 is a flowchart showing the operation of the disc playback apparatus 100 in a case where still image information is to be associated with remaining regions, with which still image information has not been associated, within audio information in accordance with an operation instruction issued by a user.

The system controller 60 determines whether or not the operation section 58 is operated by a user and an instruction (playback instruction) is given indicating that playback of audio should be started (step 100). When a playback instruction is given, a Yes determination is made, and audio is played back (step 101). Specifically, audio information stored in each track contained in the ATS to be played back is read in sequence, the audio information is supplied to the audio decoder 32, and a predetermined decoding process is performed thereon, causing audio to be supplied from the speaker 49. While no playback instruction is given, a No determined is made, and the determination operation in step 100 is repeated.

Then, the system controller 60 determines whether or not still image information corresponds to the audio information being played back (step 102). When a Yes determination is made in step 102, the system controller 60 plays back the still image (step 103). Specifically, one ASV is read from among the ASVUs stored in the RAM 38, and a predetermined decoding process is performed thereon by the video decoder 36, causing a still image to be displayed on the screen of the display device 47. Thereafter, the process returns to step 101 described above, and this and subsequent processes are repeated. When an ASV which is associated with the track being played back does not exist (a No determination in step 102), it is assumed that a process for displaying a predetermined waiting screen (for example, the display screen is entirely blue) is performed.

Next, the still image information setting section 70 within the system controller 60 determines whether or not the operation section 58 has been operated by the user and an operation instruction given for associating a still image with the remaining regions for which no still image is displayed (step 104). When the instruction for setting a still image is not performed, a No determination is made in step 104, the process returns to step 101 described above, and this and subsequent processes are repeated.

When a setting instruction for a still image is performed, a Yes determination is made in step 104. Thus, the selection screen creation section 72 performs processes for creating and displaying a predetermined selection screen for displaying a plurality of still images which are candidates to be associated with the remaining regions (step 105).

Figure 6:
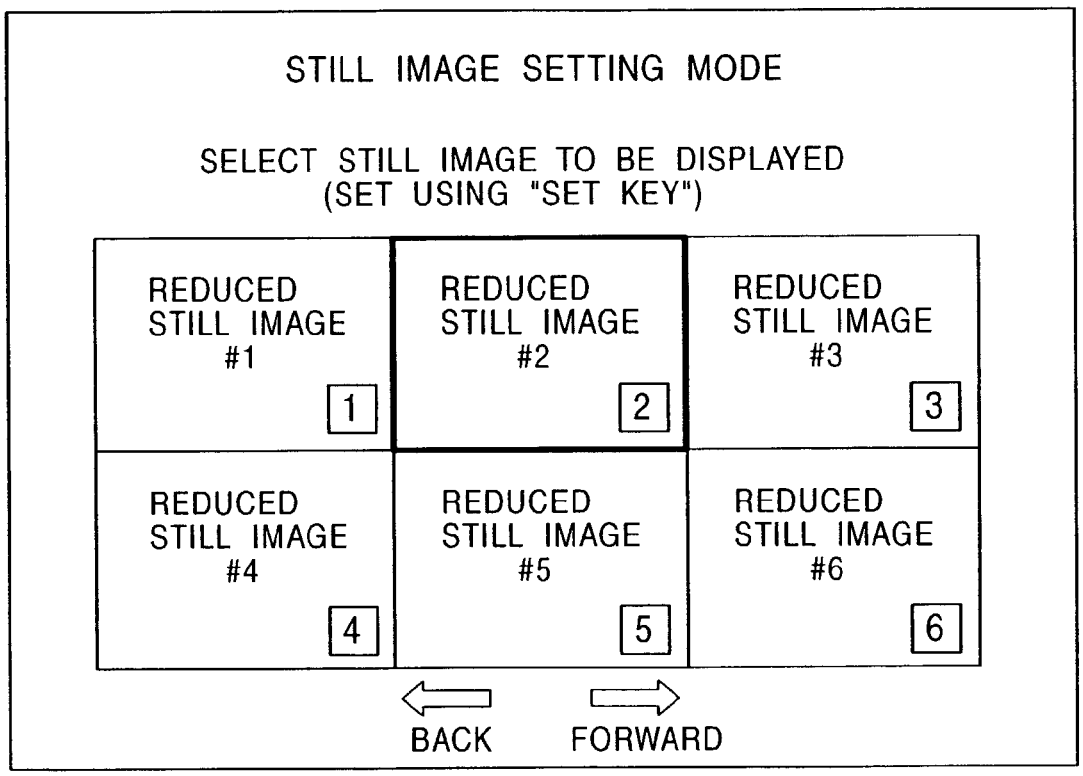
FIG. 6 shows an example of a selection screen displayed.

FIG. 6 shows an example of the selection screen displayed. In the example shown in FIG. 6, six still images which are candidates for association are reduced and displayed in such a manner that one of them can be selected. FIG. 6 shows that reduced still image #2 is highlighted, that is, a temporarily selected state. These reduced still images are created in such a way that ASVUs are read in a predetermined order (for example, in the order in which data is stored), an ASV contained therein is extracted and provided to the video decoder 36, whereby a still image is decoded, and thereafter, a reduction process, such as pixels being subsampled, is performed. Furthermore, the contents of the six reduced still images to be displayed can be updated by performing a predetermined switching operation.

In this manner, by using a selection screen containing a plurality of reduced still images, still image information can be associated while confirming the contents of the still image. Therefore, it is possible to easily and reliably select a desired still image. Furthermore, even when it is difficult to display reduced still images corresponding to many pieces of still image information recorded on the DVD 10 within one screen, some reduced still images may be displayed so that, when another reduced still image is desired to be viewed, the contents of the display are updated by performing a switching operation. Consequently, the number of reduced still images to be contained in one selection screen can be reduced. Therefore, it becomes possible to ensure a sufficient display area for each reduced still image, making the selection screen easier to view.

Returning to FIG. 5, when a predetermined selection screen is displayed, the still image information setting section 70 determines whether or not one still image is selected (step 106). Specifically, on the selection screen, after a reduced still image corresponding to a desired still image is placed in a temporarily selected state, the still image is selected by pressing a predetermined operation key (for example, a "set key") provided in the operation section 58. Alternatively, one still image can also be selected by directly entering a serial number (e.g., a number displayed in the lower right of each reduced still image) provided for each of the reduced still images by using the numerical keys provided in the operation section 58.

When no still image is selected, a No determination is made in step 106. Next, the still image information setting section 70 determines whether or not an operation instruction (switching instruction) for switching the display contents of the selection screen is given (step 107). When no switching instruction is given, a No determination is made, the process returns to step 106 described above, and this and subsequent processes are repeated.

When an instruction for switching the selection screen is given, a Yes determination is made in step 107, and the still image information setting section 70 instructs the selection screen creation section 72 to switch the display contents of the selection screen. The selection screen creation section 72 receiving the instruction returns to step 105 described above, where the selection screen creation section 72 performs processes for creating and displaying a selection screen containing reduced still images corresponding to a plurality of still images which become new candidates.

When one still image is selected on the selection screen, a Yes determination is made in step 106 described above, and the still image information setting section 70 associates the selected still image with the track of the audio information which is currently being played back and stores the still image in the RAM 62 (step 108).

For example, when the audio information which is currently being played back is audio information stored in track #2 contained in ATS #1 and when the still image selected by the user is stored in ASV #4 contained in ASVU #5, "track #2 of ATS #1" is specified as the track number, and the correspondence information for associating the still image information stored in the "ASV #4 of ASVU #5" with the audio information stored in this track is stored in the RAM 62. In this manner, by associating the still image information with each track of the audio information, an intuitive association process can be performed by a simple user operation.

When the process of step 108 is completed, the process returns to step 101 described above, and this and subsequent processes are repeated. Then, for example, when the audio information stored in track #2 of ATS #1 described above is to be played back in accordance with the information stored in the RAM 62, the still image information stored in ASV #4 of ASVU #5 is extracted to play back a still image.

b. Operation when Automatically Setting a Still Image to be Displayed

Figure 7:
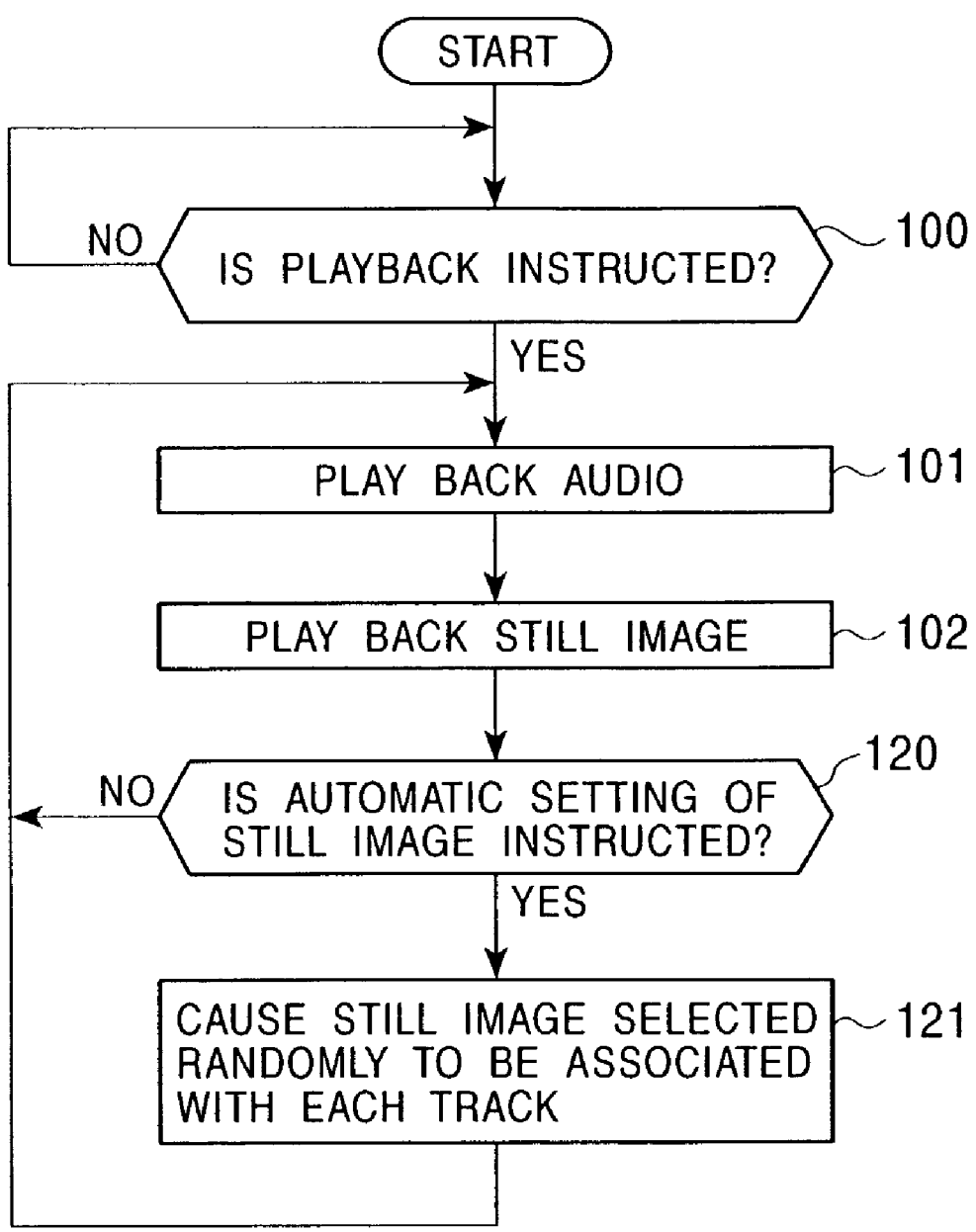
FIG. 7 is a flowchart showing the operation of a disc playback apparatus in a case where still image information is to be automatically associated with remaining regions, with which still image information was not associated, within audio information.

FIG. 7 is a flowchart showing the operation of the disc playback apparatus 100 in a case where still image information is to be automatically associated with remaining regions, with which no still image information has been associated, within the audio information. The processes of step 100 to step 102 are the same as those shown in FIG. 5 described above, and accordingly, descriptions thereof are omitted here.

Concurrently with the process of playing back audio and still images, the still image information setting section 70 determines whether or not the operation section 58 has been operated by the user to provide an instruction for automatically associating the still image information with the remaining regions (step 120). When an instruction for automatically setting the still image is not given, a No determination is made, the process returns to step 101 described above, and this and subsequent processes are repeated.

When an instruction for automatically setting the still image is given, a Yes determination is made in step 120. Thus, the still image information setting section 70 performs a process for associating randomly selected still image information with tracks having no associated still image information (step 121). Thereafter, the process returns to step 101 described above, and this and subsequent processes are repeated.

In this manner, by instructing the automatic setting of the still image information, even when audio information of a track having no associated still image information is being played back, a still image is automatically assigned and displayed. Therefore, there is no need for the user to manually set still image information for the remaining regions, and the convenience of the user can be improved.

Also, with respect to some regions having no associated still image information in the audio information, in the same manner as that described above, still image information differing from the contents which are associated in advance may be assigned randomly. As a result, it becomes possible to display a still image by performing an association which differs from the original association and which is not expected by the user, thus improving the user's enjoyment during playback.

c. Operation when Selecting Audio Information to be Played Back Using a Still Image Next, a description is given of an operation in a case where audio information which is associated with a selected still image is to be played back by selecting a desired still image on a predetermined playback instruction screen formed so as to contain a plurality of reduced still images.

Figure 8:
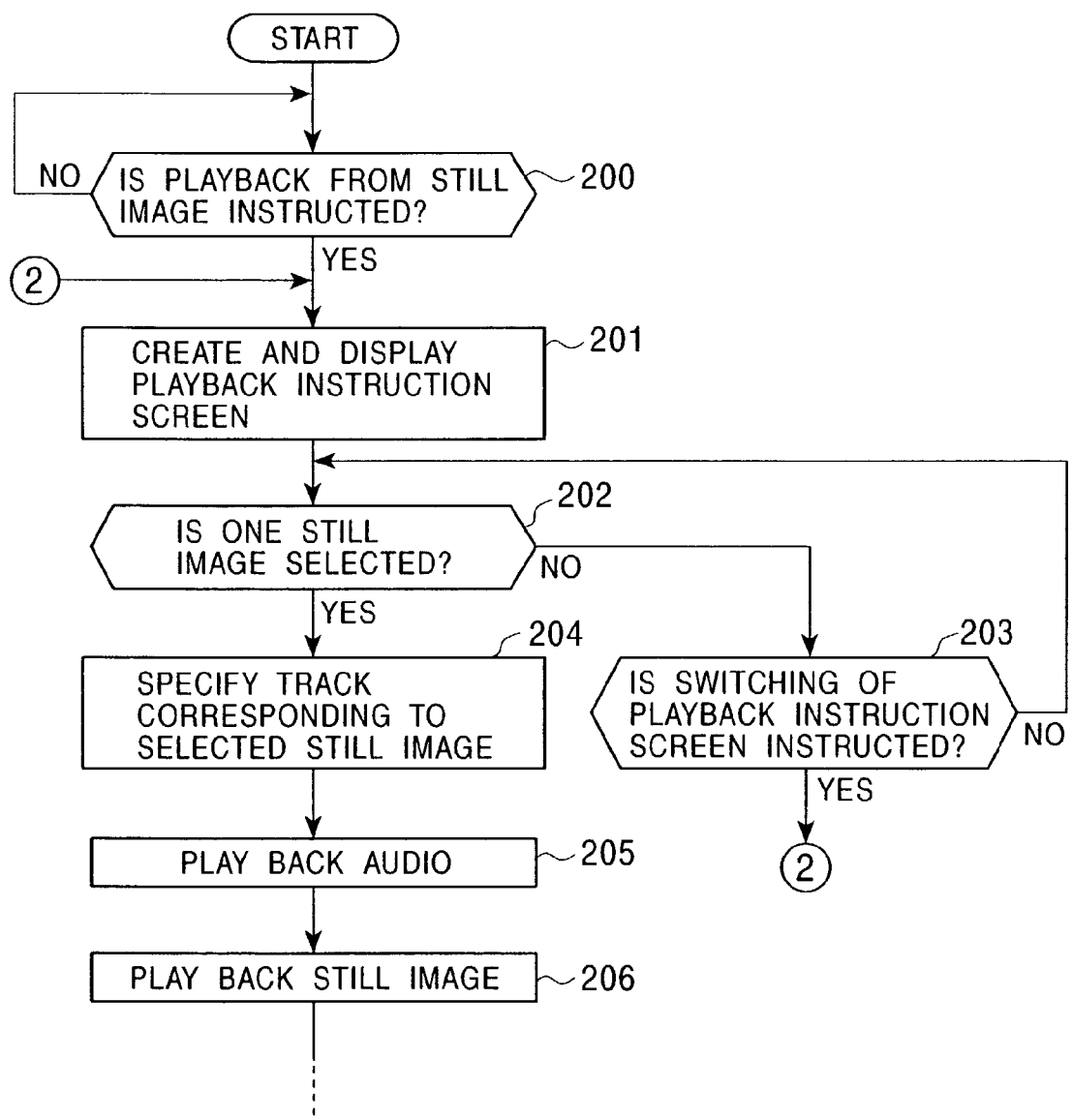
FIG. 8 is a flowchart showing the operation of a disc playback apparatus in a case where a still image is selected and the corresponding audio information is played back.

FIG. 8 is a flowchart showing the operation of the disc playback apparatus 100 in a case where a still image is selected to play back the corresponding audio information.

The system controller 60 determines whether or not an operation instruction (hereinafter referred to as a "playback instruction using a still image") has been issued for selecting a track of audio information to be played back from a predetermined playback instruction screen containing a plurality of reduced still images (step 200). While a playback instruction using a still image is not given, a No determination is made, and the determination process of step 200 is repeated.

When a playback instruction using a still image has been given, a Yes determination is made in step 200. The playback instruction screen creation section 74 performs processes for creating and displaying a predetermined playback instruction screen for displaying a plurality of still images corresponding to a plurality of tracks which are candidates to be played back (step 201).

Figure 9:
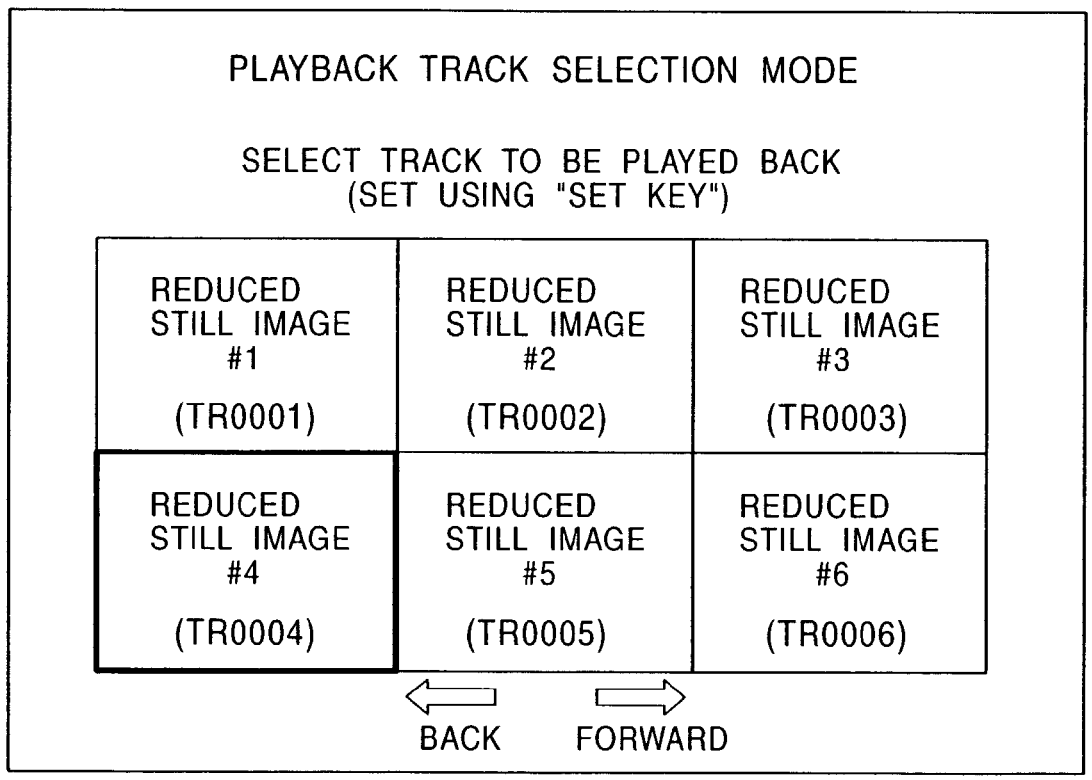
FIG. 9 shows an example of a playback instruction screen displayed.

FIG. 9 shows an example of the playback instruction screen displayed. In the example shown in FIG. 9, six reduced still images which correspond to tracks which are candidates to be played back are displayed, so that one of them can be selected.

FIG. 9 shows that reduced still image #4 is highlighted, that is, in a temporarily selected state. These reduced still images are created in such a way that ATSes are read in a predetermined order (for example, in the order in which data is stored), each track contained therein is extracted, still image information which is associated with each track is specified to decode a still image, and thereafter a reduction process, such as pixels being subsampled, is performed. In a case where a combination of still image information and a track, set by the user as desired according to a series of procedures shown in FIG. 5 described above, is stored in the RAM 62, a playback instruction screen is created by taking the contents of the setting into consideration as well. As a result, it is possible to display the still image set by the user as desired as a choice. When this still image is selected, it is possible to easily specify and play back the audio information of the corresponding track.

Furthermore, the contents of the six reduced still images to be displayed can be updated by performing a predetermined switching operation. As a result, even when it is difficult to display the reduced still images corresponding to many pieces of still image information recorded on the DVD 10 within one screen, only a few reduced still images need to be displayed so that, when another reduced still image is desired to be viewed, the contents of the display are updated by performing a switching operation. Consequently, the number of reduced still images to be contained in one selection screen can be reduced. Therefore, it becomes possible to ensure a sufficient display area of each reduced still image, allowing the playback instruction screen to be easier to view.

Returning to FIG. 8, when the predetermined playback instruction screen is displayed, the system controller 60 determines whether or not one still image is selected (step 202). In the manner described above, after a reduced still image corresponding to a desired still image is temporarily selected on the selection screen, the still image is selected by pressing a predetermined operation key provided in the operation section 58. Alternatively, one still image can also be selected by directly inputting a track number (a number such as "TR0001") assigned to each of the reduced still images by using the numerical keys provided in the operation section 58.

When a still image is not selected, a No determination is made in step 202. Next, the system controller 60 determines whether or not an operation instruction (switching instruction) for switching the display contents of the playback instruction screen (step 203) has been given. When the switching instruction is not given, a No determination is made, the process returns to step 202 described above, and this and subsequent processes are repeated.

When the switching instruction of the playback instruction screen is given, a Yes determination is made in step 203, and the system controller 60 instructs the playback instruction screen creation section 74 to switch the display contents of the playback instruction screen. The playback instruction screen creation section 74, upon receiving the instruction, returns to step 201 described above, where the playback instruction screen creation section 74 performs processes for creating and displaying a playback instruction screen containing reduced still images corresponding to a plurality of tracks which become new candidates to be played back.

When one still image is selected on the playback instruction screen, a Yes determination is made in step 202 described above, and the system controller 60 specifies the track corresponding to the selected still image (step 204).

Thereafter, the system controller 60 reads the audio information of the track specified in step 204, plays back the audio (step 205), and plays back the still image associated with this track (step 206).

In the manner described above, in the disc playback apparatus 100 of this embodiment, when the audio information of the regions (the remaining regions) to which still image information has not been assigned is to be played back, a still image is displayed on the screen by assigning another piece of still image information recorded on the same DVD 10 on the basis of a manual selection or automatically. Consequently, the image display function possessed by the disc playback apparatus 100 can be utilized effectively. Furthermore, for a manufacturer of the DVD 10, since still images can be displayed without having to associate the still image information with all the regions of the audio information, there is an advantage that the amount of still image information to be recorded can be reduced, and the burden on the manufacturer can be reduced.

Furthermore, by displaying a predetermined playback instruction screen and by selecting a still image (reduced still image) contained in this playback instruction screen as desired, the playback of the audio information corresponding to the selected still image can be instructed. As a result, when compared to a case in which the track number is specified as in the conventional case in order to instruct a playback, a selection while visually confirming the contents of the still image becomes possible, and the case of operation can be improved.

The present invention is not limited to the above-described embodiments, and various modifications are possible within the spirit and scope of the present invention. For example, although in the above-described embodiments still image information to be associated with audio information is selected from a plurality of reduced still images displayed on a predetermined selection screen, the still image information may be selected by specifying a predetermined number which specifies one of a plurality of pieces of still image information. Specifically, for the number which specifies one of a plurality of pieces of still image information, a number corresponding to a position at which still image information is recorded on the DVD 10 may be used, or a track number on the DVD 10 on which audio information corresponding to still image information is recorded may be used.

FIG. 10 shows an example of a selection screen displayed in a case where desired still image information is selected using a number corresponding to a position at which still image information is recorded. As shown in FIG. 10, still-image numbers ("1" to "150" in FIG. 10), which are predetermined serial numbers, are set to correspond to the position at which the still image information is recorded on the DVD 10, so that, by selecting one of the still-image numbers, the still image information can be specified. In FIG. 10, still-image number 92 is selected, and reduced still image #92 is displayed on the basis of the still image information corresponding to this still-image number. In this manner, when a still-image number set to correspond to the position at which the still image information is stored is used as the numbers which specify a plurality of pieces of still image information, it becomes easy to intuitively recognize the position at which the still image information is stored, making it possible to improve the ease of operation.

FIG. 11 shows an example of a selection screen displayed in a case where desired still image information is selected using a track number of audio information corresponding to still image information. As shown in FIG. 11, a track number of audio information can be selected by using the operation section 58. By entering a track number, still image information corresponding to the audio information of this track number can be selected. In FIG. 11, a track number 0008 (TR0008) is entered, and reduced still image #13 is displayed on the basis of the still image information corresponding to the audio information of this track number. In general, the user recognizes the audio information by using the track number as units, and, often, the user recognizes a desired still image associated with the track number, such as the still image displayed while the audio information of track 1 is being played back. Therefore, as shown in FIG. 11, by selecting still image information using a track number, it is possible to easily specify desired still image information.

Although in the above-described embodiments, a case in which one piece of still image information is associated with a track, which is a predetermined unit of audio information, is described as an example, a plurality of pieces of still image information may be associated with one track. The timing at which the plurality of still images are displayed in this case may be such that, for example, a value is calculated by dividing a predetermined playback time T of a track by the number N of still images (T/N) and the still image is switched and displayed each time the audio information has been played for a time corresponding to this value T/N.

Figure 12:
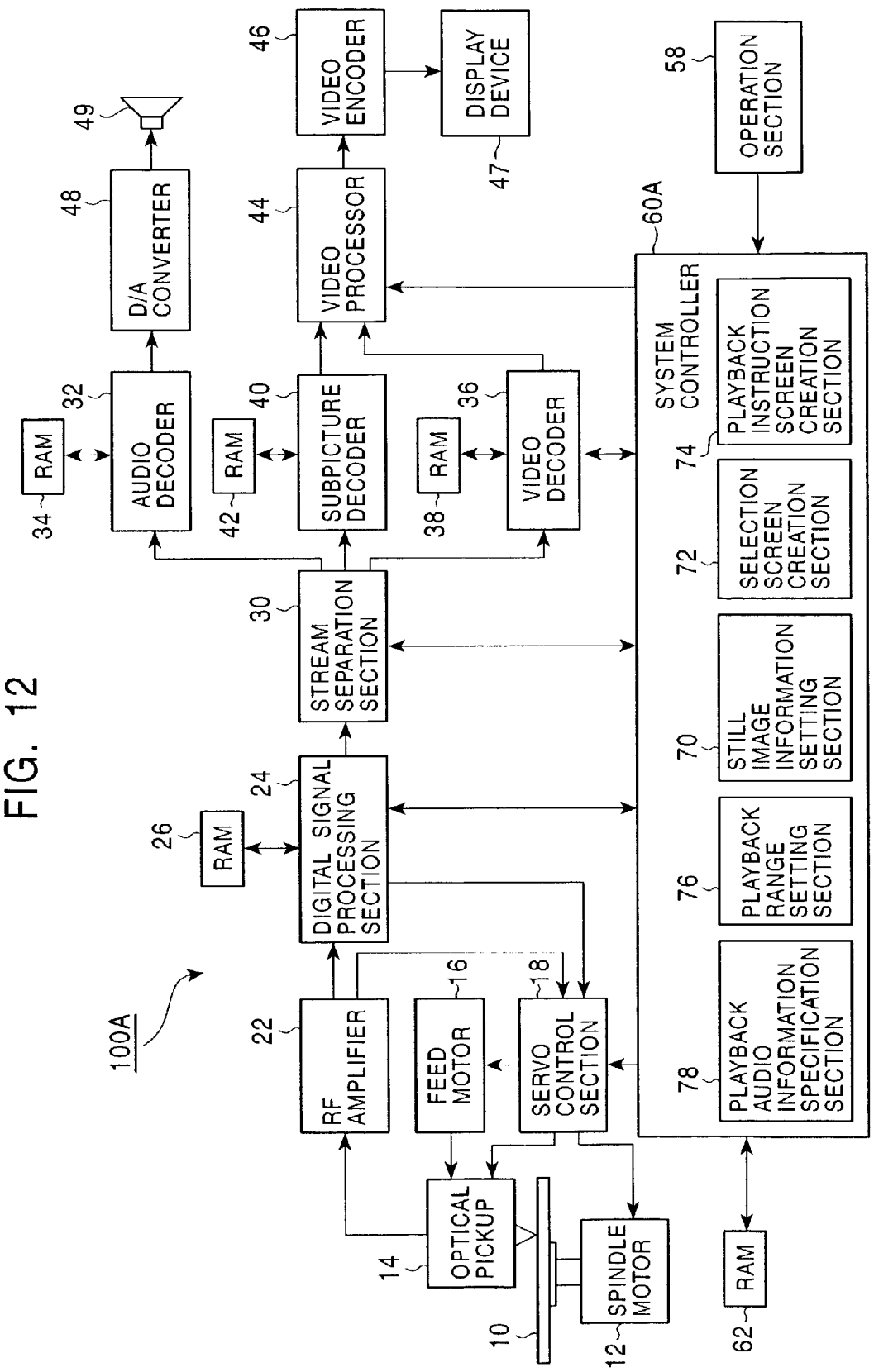
FIG. 12 shows the configuration of a disc playback apparatus in a modification in which the playback range of audio information with which still image information is associated is specified as desired.

Furthermore, the playback range of the audio information with which the still image information is associated may also be specified by the user as desired. FIG. 12 shows the configuration of a disc playback apparatus in a modification in which the playback range of audio information with which still image information is associated is specified as desired. A disc playback apparatus 100A shown in FIG. 12 basically has the same configuration as that of the disc playback apparatus 100 of the above-described embodiments and differs in that the system controller 60 is replaced with a system controller 60A having a different internal configuration. A description will now be given mainly by considering the differences.

The system controller 60A shown in FIG. 12 comprises a still image information setting section 70, a selection screen creation section 72, a playback instruction screen creation section 74, and a playback range setting section 76.

The playback range setting section 76 sets the playback range of audio information with which still image information is associated in accordance with an operation instruction of the user using the operation section 58. This playback range setting section 76 corresponds to the range specification section.

FIG. 13 shows an example of a setting screen displayed for setting the playback range of audio information with which still image information is associated. This setting screen is created and displayed by the selection screen creation section 72 when an operation instruction for performing a detailed setting of the playback range is given after one piece of still image information is selected by using the selection screen shown in FIG. 6 described above.

On the setting screen shown in FIG. 13, a reduced still image corresponding to one piece of still image information selected by using the selection screen is displayed, and the track number and playback time of the audio information can be entered by using the operation section 58. Then, the playback range setting section 76 sets the playback range of the audio information in accordance with the operation using the operation section 58. In the example shown in FIG. 13, in the audio information of track number 0008 (TR0008), a range from 30 seconds (displayed as 00:30 in the figure) after playback has started up to 2 minutes 50 seconds (displayed as 02:50 in the figure) is set as the playback range. Then, when the playback range of the audio information with which the still image information is associated is set by the playback range setting section 76, the still image information setting section 70 sets the correspondence information by using this playback range of the audio information and stores the information in the RAM 62.

In this manner, as a result of setting the playback range of the audio information with which the still image information is associated, for example, for audio information of a particular track, a time period in which still image information is displayed when audio information is to be played back can be set in detail, such as a still image A for the initial one minute from the playback start time, a still image B for the next 30 seconds, and so on.

Although in the above-described embodiments, a process is described for automatically assigning a still image to the remaining regions of the audio information having no associated still image information by performing a predetermined operation instruction during a playback operation, when it is desired that this automatic assignment process for a still image is always performed, that intent may be set in advance as an initial setting of the disc playback apparatus. In this case, in a newly loaded DVD 10, when remaining regions having no associated still image information exist within the audio information, the still image information is assigned automatically without performing any operation instruction, and therefore, the convenience of the user can be improved even more.

Although in the above-described embodiments, still image information is associated with remaining regions having no associated still image information, within the audio information, another piece of still image information desired by the user may be assigned to some regions of the audio information with which the still image information has already been associated. The association in this case may be performed in such a way that the determination process of step 102 shown in FIG. 5 is omitted, a still image playback operation of step 103 is performed after the audio playback operation of step 101 is performed, and then the process proceeds to the determination operation of step 104. As a result, when the correspondence between the audio information and the still image information, set in advance on the DVD 10, does not match the user's preference, it is possible for the user to set this correspondence as desired.

Although in the above-described embodiments, a description is given of a disc playback apparatus for selectively displaying a plurality of still images while audio information is played back in accordance with the DVD-audio standard by using the DVD 10 on which audio information and still image information are recorded, the scope of application of the present invention is not limited to this. In addition, the present invention can be applied to a disc playback apparatus for playing back audio information and still image information stored on various disc-type recording media, such as so-called video CDs and data-writable DVD-RAM discs.

What is claimed is:

1. A disc playback apparatus for performing a playback operation by using a disc-type recording medium in which audio information and still image information are recorded, said disc playback apparatus comprising:
   still image information setting section for setting said still image information corresponding to said audio information;
   a selection screen creation section for creating a selection screen in which a plurality of reduced still images is contained within one screen;
   a first operation section for selecting one of said reduced still images from within said selection screen created by said selection screen creation section, wherein said still image information setting section associates said still image information corresponding to said reduced still image selected by said first operation section with said audio information;
   a correspondence information storage section for storing correspondence information set by said still image information setting section; and
   a disc information playback section for playing back, based on said correspondence information, said still image information together with said audio information corresponding to said still image information;
   wherein said still image information setting section is configured for, when some of a plurality of pieces of still image information correspond in advance to some regions of said audio information on said recording medium and when no still image information corresponds to remaining regions of said audio information, automatically associating pieces of still image information with said remaining regions without a user selecting said pieces of still image information.

2. A disc playback apparatus according to claim 1, wherein said still image information setting section is configured to automatically associate said still image information with said audio information randomly.

3. A disc playback apparatus according to claim 1, wherein said still image information setting section specifies a track number of said disc-type recording medium in which said audio information is stored.

4. A disc playback apparatus according to claim 1, wherein said first operation section is capable of switching said selection screen, and said selection screen creation section updates said plurality of reduced still images contained in said selection screen when an operation for switching said selection screen is performed by said first operation section.

5. A disc playback apparatus for performing a playback operation by using a disc-type recording medium in which audio information and still image information are recorded, said disc playback apparatus comprising:
   a still image information setting section configured for, when some of a plurality of pieces of still image information correspond in advance to some regions of said audio information on said recording medium and when no still image information corresponds to remaining regions of said audio information, automatically associating pieces of still image information with said remaining regions without a user selecting said pieces of still image information;
   a correspondence information storage section for storing correspondence information set by said still image information setting section; and
   a disc information playback section for playing back, based on said correspondence information, said still image information together with said audio information corresponding to said still image information.

6. A disc playback apparatus according to claim 5, further comprising a second operation section for specifying numbers which identify said plurality of pieces of still image information,
   wherein said still image information setting section performs a process for associating said still image information with said remaining regions on the basis of the operation of said second operation section.

7. A disc playback apparatus according to claim 6, wherein a number identified by said second operation section is a number corresponding to a recording position of said still image information in said disc-type recording medium.

8. A disc playback apparatus according to claim 6, wherein a number identified by said second operation section is a track number of said disc-type recording medium in which said audio information corresponding to said still image information is recorded.

9. A disc playback apparatus according to claim 5, wherein said still image information setting section automatically associates pieces of still image information with said remaining regions randomly.

10. A disc playback apparatus for performing a playback operation by using a disc-type recording medium in which audio information and still image information are recorded, said disc playback apparatus comprising:
   a still image information setting section for setting said still image information corresponding to said audio information;
   a selection screen creation section for creating a selection screen in which a plurality of reduced still images is contained within one screen;
   a first operation section for selecting one of said reduced still images from within said selection screen created by said selection screen creation section, wherein said still image information setting section associates said still image information corresponding to said reduced still image selected by said first operation section with said audio information;
   a range specification section for specifying a playback range of said audio information with which said still image information is associated by said still image information setting section, whereby each of a plurality of pieces of still image information can be associated with a specified playback range of a piece of audio information;
   a correspondence information storage section for storing correspondence information set by said still image information setting section;
   a playback instruction screen creation section for creating a playback instruction screen in which, when a plurality of pieces of still image information which are associated with said audio information by said still image information setting section are played back in a reduced manner, a plurality of reduced still images are contained within one screen;
   a third operation section for selecting one of said reduced still images from within said playback instruction screen created by said playback instruction screen creation section; and
   a disc information playback section for, when one of said reduced still images is selected using said third operation section, playing back said audio information corresponding to the selected reduced still image;
   wherein said still image information setting section is configured for, when some of a plurality of pieces of still image information correspond in advance to some regions of said audio information on said recording medium and when no still image information corresponds to remaining regions of said audio information, automatically associating pieces of still image information with said remaining regions without a user selecting said pieces of still image information.

11. A disc playback apparatus according to claim 10, wherein said third operation section is capable of switching said playback instruction screen, and said playback instruction screen creation section updates said plurality of reduced still images contained in said playback instruction screen when an operation for switching said playback instruction screen is performed using said third operation section.

12. A disc playback apparatus according to claim 10, further comprising a playback audio information specification section for, when one of said reduced still images is selected using said third operation section, specifying said audio information corresponding to the selected reduced still image on the basis of said correspondence information stored in said correspondence information storage section.

13. A disc playback method for playing back a disc-type recording medium in which audio information and still image information are recorded, said disc playback method comprising:
   setting still image information corresponding to audio information;
   storing the set correspondence information; and
   playing back, based on the stored correspondence information, the still image information together with said audio information corresponding to the still image information;
   wherein said act of setting comprises:
   creating a selection screen in which a plurality of reduced still images is contained within one screen;
   selecting one of said reduced still images from within said selection screen; and
   associating said still image information corresponding to said selected reduced still image with said audio information;
   wherein when some of a plurality of pieces of still image information correspond in advance to some regions of said audio information on said recording medium and when no still image information corresponds to remaining regions, automatically associating pieces of still image information with said remaining regions without a user selecting said pieces of still image information.

14. A disc playback method for playing back a disc-type recording medium in which audio information and still image information are recorded, said disc playback method comprising:
   when some of a plurality of pieces of still image information correspond in advance to some regions of said audio information on said recording medium and when no still image information corresponds to remaining regions, automatically associating pieces of still image information with said remaining regions without a user selecting said pieces of still image information;
   storing the set correspondence information; and
   playing back, based on said stored correspondence information, the still image information together with the audio information corresponding to said still image information.

15. A disc playback method according to claim 14, wherein the automatic association of pieces of still image information with said remaining regions is conducted randomly.

16. A disc playback method for playing back a disc-type recording medium in which audio information and still image information are recorded, said disc playback method comprising:
   setting still image information corresponding to audio information;
   storing the set correspondence information;
   creating a playback instruction screen in which, when a plurality of pieces of still image information corresponding to the stored audio information are played back in a reduced manner, a plurality of reduced still images are contained within one screen;
   selecting one of the reduced still images from within said created playback instruction screen; and
   playing back audio information corresponding to the selected reduced still image when one of the reduced still images is selected by said selection operation;

wherein said act of setting comprises:

creating a selection screen in which a plurality of reduced still images is contained within one screen;

selecting one of said reduced still images from within said selection screen;

specifying a playback range of said audio information with which said selected reduced still image is associated, whereby each of a plurality of reduced still images can be associated within a specified playback range of a piece of audio information; and associating said still image information corresponding to said selected reduced still image with said audio information;

wherein when some of a plurality of pieces of still image information correspond in advance to some regions of said audio information on said recording medium and when no still image information corresponds to remaining regions, automatically associating pieces of still image information with said remaining regions without a user selecting said pieces of still image information.

* * * * *